United States Patent
Miyazaki et al.

(10) Patent No.: US 8,715,020 B2
(45) Date of Patent: May 6, 2014

(54) OUTBOARD MOTOR

(75) Inventors: Satoshi Miyazaki, Shizuoka (JP); Atsushi Suzuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 13/453,048

(22) Filed: Apr. 23, 2012

(65) Prior Publication Data

US 2012/0289104 A1  Nov. 15, 2012

(30) Foreign Application Priority Data

May 12, 2011  (JP) .................................. 2011-107504

(51) Int. Cl.
  *B63H 1/15*  (2006.01)
(52) U.S. Cl.
  USPC .......................................................... 440/52
(58) Field of Classification Search
  USPC ............................................. 440/52, 3, 6, 75
  See application file for complete search history.

(56) References Cited

U.S. PATENT DOCUMENTS

| | | | | |
|---|---|---|---|---|
| 4,925,409 A * | 5/1990 | Johnson | ........................... | 440/52 |
| 4,955,833 A * | 9/1990 | Lam et al. | ........................ | 440/49 |
| 5,074,812 A * | 12/1991 | Watanabe | ........................ | 440/52 |
| 5,309,877 A * | 5/1994 | Shigedomi et al. | ........ | 123/195 P |
| 5,613,470 A * | 3/1997 | Shiomi et al. | .............. | 123/195 P |
| 5,865,655 A | 2/1999 | Hiraoka et al. | | |
| 6,062,927 A * | 5/2000 | Hiraoka et al. | ............. | 440/88 R |
| 6,547,612 B1* | 4/2003 | Bader | ............................ | 440/75 |
| 6,637,401 B1* | 10/2003 | Nozue | ....................... | 123/198 R |
| 6,652,334 B1* | 11/2003 | Kusche et al. | .................. | 440/52 |
| 6,763,792 B2* | 7/2004 | Okamoto | ................... | 123/90.31 |
| 7,726,452 B2* | 6/2010 | Kraner | .......................... | 188/378 |
| 8,266,983 B2* | 9/2012 | Kaneyasu et al. | ............ | 74/574.4 |
| 2007/0243775 A1* | 10/2007 | Osakabe et al. | ............... | 440/76 |
| 2012/0289104 A1* | 11/2012 | Miyazaki et al. | ............... | 440/52 |

FOREIGN PATENT DOCUMENTS

JP  7-269657 A  10/1995

* cited by examiner

*Primary Examiner* — Lars A Olson
*Assistant Examiner* — Jovon Hayes
(74) *Attorney, Agent, or Firm* — Keating & Bennett, LLP

(57) ABSTRACT

An outboard motor includes an engine, a flywheel, a twisting member, and a damper. The engine includes a crankshaft that is rotatable around a crank axis extending in the up-down direction and includes an upper end portion disposed along the crank axis. The flywheel includes a joint portion that is disposed above the upper end portion of the crankshaft and joined to the upper end portion. The twisting member is disposed along the crank axis above the upper end portion of the crankshaft, and is arranged to rotate around the crank axis together with the crankshaft. The damper is disposed above the flywheel at a distance from the flywheel, and joined to the twisting member.

11 Claims, 6 Drawing Sheets

OUTBOARD MOTOR

BACKGROUND OF THE INVENTION

1. Field of the Invention

The present invention relates to an outboard motor.

2. Description of the Related Art

In conventional outboard motors, a damper is sometimes attached to an engine installed in the outboard motor to absorb twisting vibration of a crankshaft.

For example, in the engine described in Japanese Unexamined Patent Application Publication No. H07-269657, a flywheel is fixed to an upper end portion of the crankshaft. The damper includes a rubber damper and a weight. The weight is attached to the flywheel via the rubber damper. Therefore, the damper is directly attached to the flywheel.

Similarly, in the engine described in U.S. Pat. No. 5,865,655, a flywheel is fixed to an upper end portion of the crankshaft. The damper includes a rubber damper and a pulley. The pulley is attached to a hub integrated with the flywheel. Therefore, the damper is directly attached to the flywheel.

SUMMARY OF THE INVENTION

The inventors of preferred embodiments of the present invention described and claimed in the present application conducted an extensive study and research regarding an outboard motor, such as the one described above, and in doing so, discovered and first recognized new unique challenges and previously unrecognized possibilities for improvements as described in greater detail below.

During driving of an engine, elastic twist of the crankshaft (twisting around the crank axis) repeatedly occurs and the crankshaft vibrates in some cases. Specifically, during driving of an engine, twisting vibration of the crankshaft occurs in some cases. The damper absorbs the twisting vibration of the crankshaft to reduce vibration of the engine. The vibration reducing effect of the damper is sufficiently obtained by twisting the damper.

However, in the case of the two conventional technologies described above, the damper is directly attached to the flywheel, which creates a heavy load, so that the twisting vibration of the crankshaft cannot be efficiently reduced.

In detail, twisting vibration of the crankshaft includes nodes in which the amount of twist is large and anti-nodes in which the amount of twist is small or almost zero. The flywheel is relatively heavy, so that the portion supporting the flywheel is hardly twisted, and a vibration node is positioned near the flywheel. In the two conventional technologies described above, the damper is attached to the flywheel corresponding to the vibration node. Therefore, the twist amount of the damper is small, and the effect of the damper may be insufficient.

In order to overcome the previously unrecognized and unsolved challenges described above, a preferred embodiment of the present invention provides an outboard motor including an engine, a flywheel, a twisting member, and a damper. In detail, the engine includes a crankshaft that is rotatable around a crank axis extending in the up-down direction and includes an upper end portion disposed along the crank axis. The flywheel is disposed above the upper end portion of the crankshaft and includes a joint portion joined to the upper end portion. The twisting member is disposed along the crank axis above the upper end portion of the crankshaft, and is arranged to rotate around the crank axis together with the crankshaft. The damper is disposed above the flywheel at a distance from the flywheel, and joined to the twisting member.

With this arrangement, the flywheel is disposed above the upper end portion of the crankshaft, and the damper is disposed above the flywheel at a distance from the flywheel. The damper is joined to the twisting member disposed along the crank axis above the upper end portion of the crankshaft. When the crankshaft twists around the crank axis, the twisting member also twists, and this twist of the crankshaft is transmitted to the damper via the twisting member. Thus, the damper is spaced away from the flywheel at a location corresponding to a vibration node, and joined to the twisting member at a location corresponding to a vibration anti-node. Therefore, the twisting vibration of the crankshaft is efficiently transmitted to the damper, and the damper twists together with the crankshaft. Accordingly, the twisting vibration of the crankshaft is efficiently absorbed by the damper, and the vibration of the engine is effectively and significantly reduced.

The outboard motor may include a first drive wheel, a first driven wheel, and an endless first transmission member. In this case, the first drive wheel may be disposed between the flywheel and the damper and arranged to rotate around the crank axis together with the crankshaft. The first driven wheel may be arranged to rotate around an axis parallel to the crank axis. The first transmission member is wound around the first drive wheel and the first driven wheel. The first transmission member is arranged to transmit rotation of the first drive wheel to the first driven wheel. The twisting member may include the first drive wheel. The first drive wheel may have an outer diameter smaller than an outer diameter of the damper.

The outboard motor may further include a second drive wheel, a second driven wheel, and an endless second transmission member. In this case, the second drive wheel may be arranged to rotate around the crank axis together with the crankshaft. Further, the second drive wheel may be integrated with the damper. The second driven wheel may be arranged to rotate around an axis parallel to the crank axis. The second transmission member is wound around the second drive wheel and the second driven wheel. The second transmission member is arranged to transmit rotation of the second drive wheel to the second driven wheel.

The outboard motor may further include a third drive wheel, a third driven wheel, and an endless third transmission member. In this case, the third drive wheel may be disposed between the first drive wheel and the damper and arranged to rotate around the crank axis together with the crankshaft. The third driven wheel may be arranged to rotate around an axis parallel to the crank axis. The third transmission member is wound around the third drive wheel and the third driven wheel. The third transmission member is arranged to transmit rotation of the third drive wheel to the third driven wheel. The twisting member may include the third drive wheel. The third drive wheel may have an outer diameter smaller than an outer diameter of the damper.

The crankshaft may include a journal disposed along the crank axis. In this case, the twisting member may include a shaft portion having an outer diameter smaller than an outer diameter of the journal. More preferably, the twisting member may have an outer diameter smaller than the outer diameter of the journal.

It is preferable that the twisting member has an outer diameter smaller than the outer diameter of the damper. It is more preferable that the twisting member has an outer diameter smaller than both of the outer diameter of the journal and the outer diameter of the damper.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
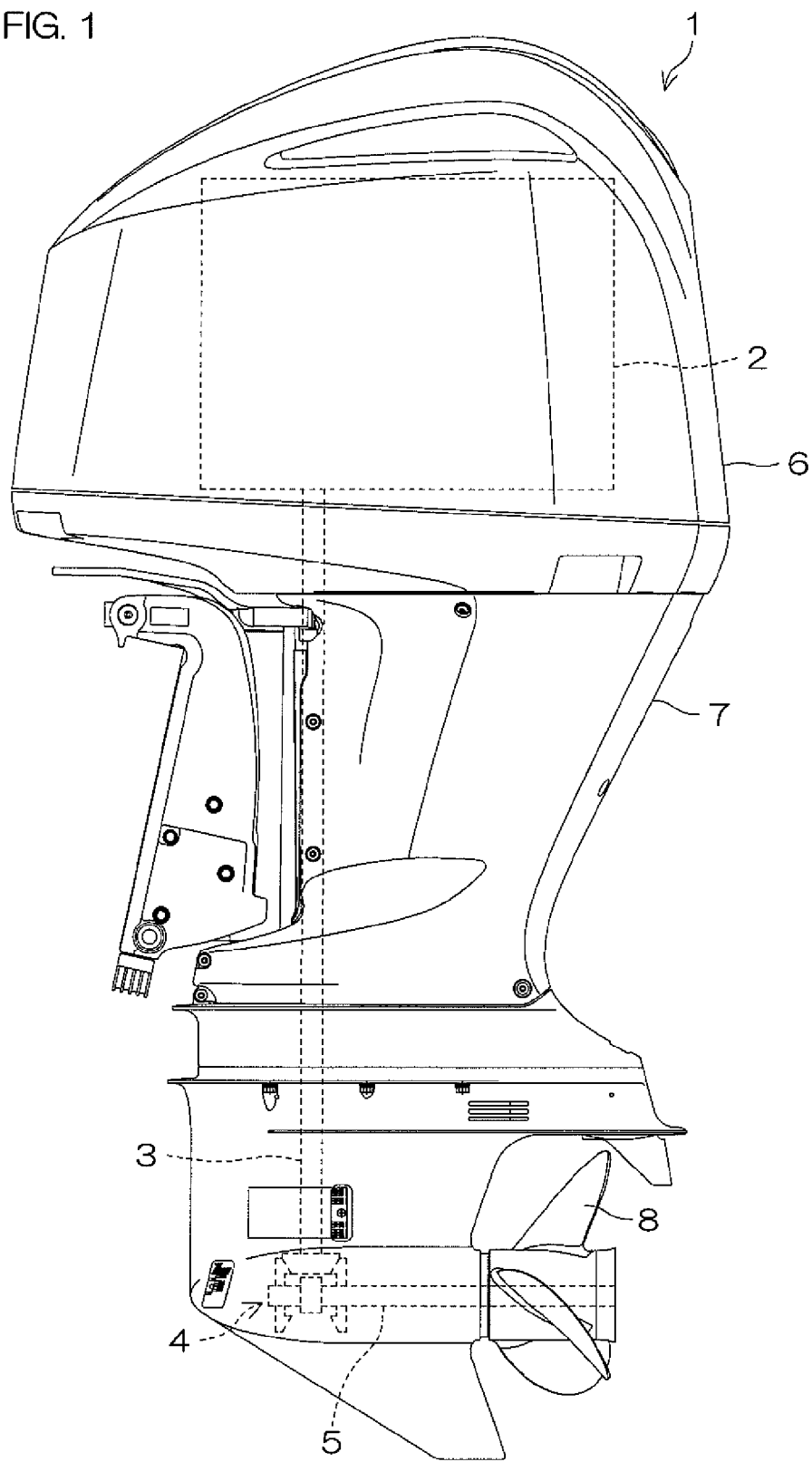
FIG. 1 is a side view of an outboard motor according to a first preferred embodiment of the present invention.

FIG. 1 is a side view of an outboard motor 1 according to a first preferred embodiment of the present invention.

An outboard motor 1 includes an engine 2, a drive shaft 3, a gear mechanism 4, and a propeller shaft 5. Further, the outboard motor 1 includes an engine cover 6 that houses the engine 2, and a casing 7 disposed below the engine cover 6. The drive shaft 3 extends in the up-down direction below the engine 2. An upper end portion of the drive shaft 3 is joined to the engine 2, and a lower end portion of the drive shaft 3 is coupled to the front end portion of the propeller shaft 5 via the gear mechanism 4. The propeller shaft 5 extends in the front-rear direction inside the casing 7. The rear end portion of the propeller shaft 5 projects rearward from the casing 7. The propeller 8 is joined to the rear end portion of the propeller shaft 5. When the drive shaft 3 is driven to rotate by the engine 2, the rotation of the drive shaft 3 is transmitted to the propeller shaft 5 via the gear mechanism 4. Accordingly, the propeller 8 rotates together with the propeller shaft 5 to generate a propulsive force to propel a marine vessel.

Figure 2:
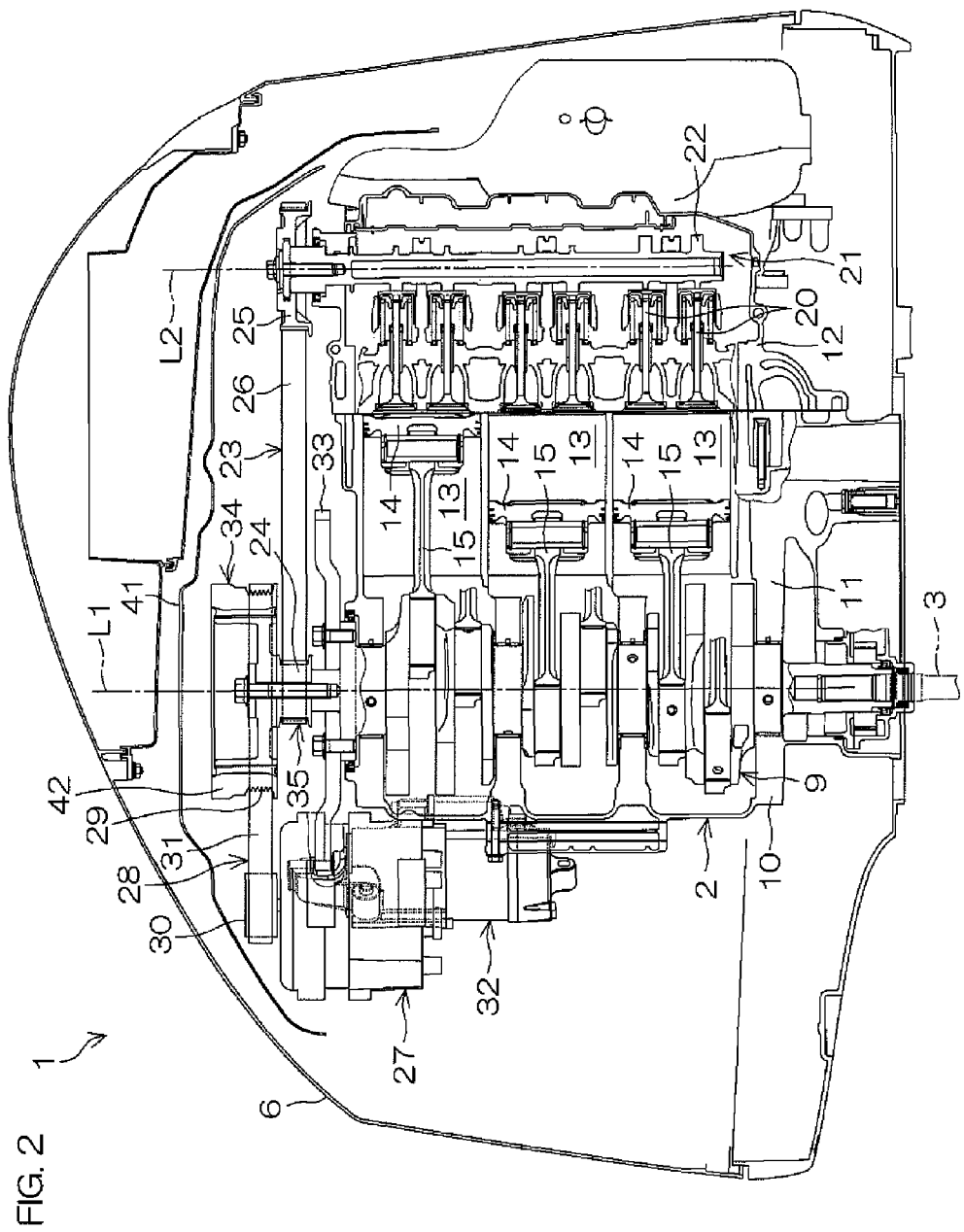
FIG. 2 is a sectional view for describing an arrangement inside an engine cover according to the first preferred embodiment of the present invention.
Figure 3:
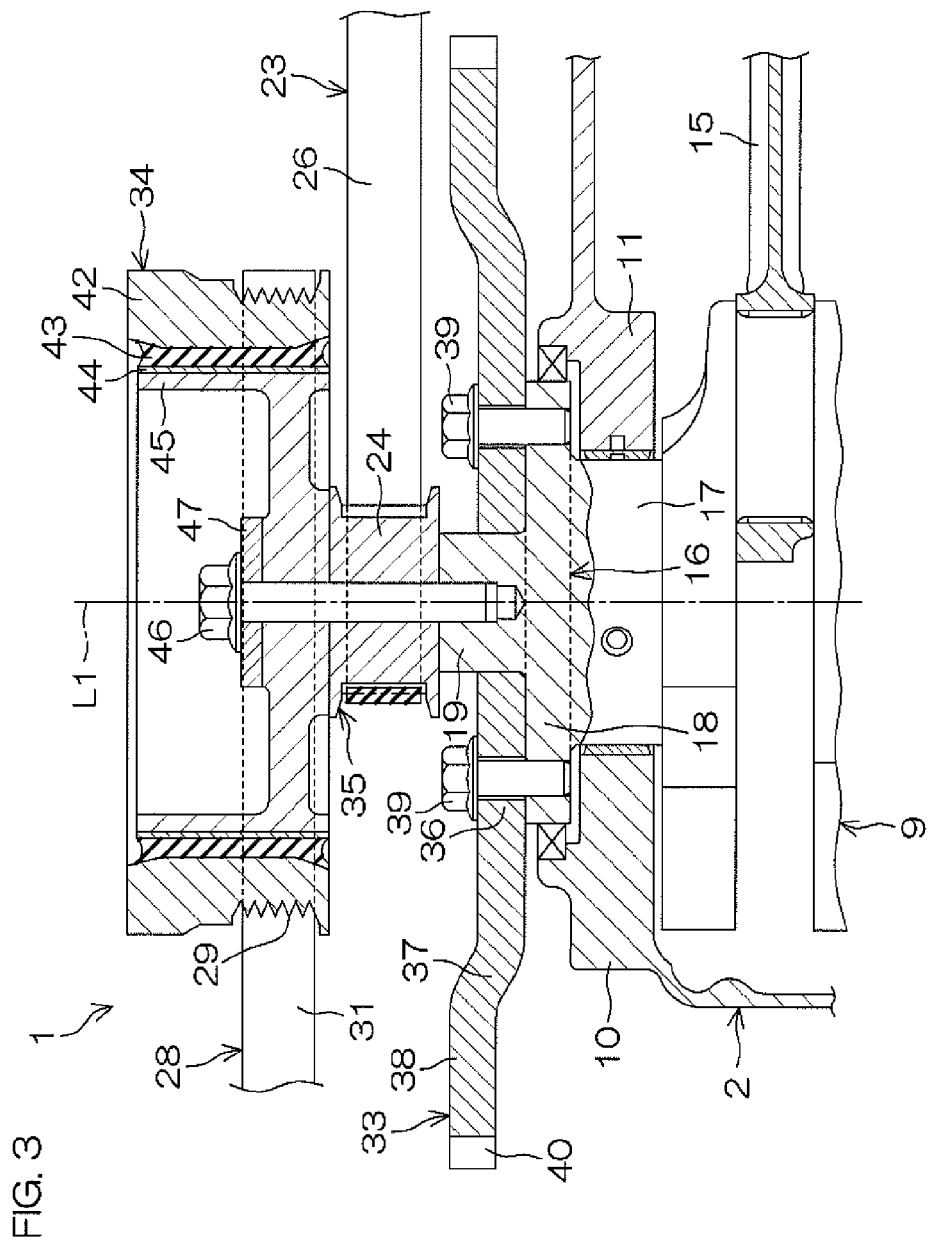
FIG. 3 is an enlarged view of a portion of FIG. 2.

FIG. 2 is a sectional view for describing an arrangement inside the engine cover 6 according to the first preferred embodiment of the present invention. FIG. 3 is an enlarged view of a portion of FIG. 2. In FIG. 2, hatching is omitted.

As shown in FIG. 2, the engine 2 includes a crankshaft 9 that is rotatable around a crank axis L1 extending in the up-down direction. Further, the engine 2 includes a crankcase 10, a cylinder body 11, and a cylinder head 12. The cylinder body 11 and the crankcase 10 hold the crankshaft 9 rotatably around the crank axis L1. The cylinder body 11 and the cylinder head 12 include a plurality of cylinders 13. The engine 2 may be a straight engine including a plurality of cylinders aligned in series, a V engine including a plurality of cylinders disposed along a V line, or other type engines. Each cylinder 13 preferably extends in the horizontal direction. The engine 2 includes a plurality of pistons 14 disposed inside the cylinders 13, and a plurality of connecting rods 15 that join the pistons 14 and the crankshaft 9.

As shown in FIG. 3, the crankshaft 9 includes an upper end portion 16 and a journal 17 disposed along the crank axis L1.

The upper end portion 16 is disposed above the journal 17. The upper end portion 16 is disposed outside the crankcase 10 and the cylinder body 11. The journal 17 is disposed inside the crankcase 10 and the cylinder body 11. The journal 17 preferably has a disk shape. The journal 17 is held rotatably around the crank axis L1 by the crankcase 10 and the cylinder body 11. The upper end portion 16 includes a disk portion 18 with an outer diameter larger than that of the journal 17, and a columnar shaft portion 19 with an outer diameter smaller than that of the journal 17. The disk portion 18 and the shaft portion 19 may be integrated together, or may be independent members separate from each other. In the first preferred embodiment, the disk portion 18 preferably is integrated with the shaft portion 19. Further, the disk portion 18 preferably is integrated with the journal 17. The shaft portion 19 is disposed above the disk portion 18, and extends in the up-down direction along the crank axis L1.

As shown in FIG. 2, the engine 2 includes an intake valve 20 that opens and closes an intake port, an exhaust valve that opens and closes an exhaust port, and a valve drive mechanism 21 that drives the intake valve 20 and the exhaust valve. The valve drive mechanism 21 includes a camshaft 22 rotatable around a cam axis L2 parallel to the crank axis L1. The intake valve 20, the exhaust valve, and the camshaft 22 are held by the cylinder head 12. Rotation of the crankshaft 9 is transmitted to the camshaft 22. Accordingly, the camshaft 22 is driven to rotate around the cam axis L2. The intake valve 20 and the exhaust valve are driven by the rotation of the camshaft 22.

As shown in FIG. 2, the engine 2 includes a first winding transmission device 23 that transmits rotation of the crankshaft 9 to the camshaft 22. The first winding transmission device 23 includes a first drive wheel 24, a first driven wheel 25, and an endless first transmission member 26 wound around the first drive wheel 24 and the first driven wheel 25. The first drive wheel 24 and the first driven wheel 25 may be pulleys or gears such as sprockets, for example. The first transmission member 26 may be a belt or a chain, for example. The first drive wheel 24 is disposed on the crank axis L1, and rotates around the crank axis L1 together with the crankshaft 9. The first driven wheel 25 is disposed on the cam axis L2, and rotates around the cam axis L2 together with the camshaft 22. The rotation of the first drive wheel 24 is transmitted to the first driven wheel 25 by the first transmission member 26. Accordingly, the rotation of the crankshaft 9 is transmitted to the camshaft 22.

As shown in FIG. 2, the outboard motor 1 includes an alternator 27 as a power generation device that converts the rotation of the crankshaft 9 into electric energy. The alternator 27 is housed inside the engine cover 6. The alternator 27 is attached to the engine 2. The alternator 27 includes a rotor including a magnet and a stator including a coil although they are not shown. The rotor is rotatable around an axis parallel to the crank axis L1. The rotation of the crankshaft 9 is transmitted to the rotor of the alternator 27. Accordingly, the rotor and the stator of the alternator 27 rotate relative to each other to convert the rotation of the crankshaft 9 into electric energy. Thus, the alternator 27 generates power.

As shown in FIG. 2, the engine 2 includes a second winding transmission device 28 that transmits the rotation of the crankshaft 9 to the alternator 27. The second winding transmission device 28 includes a second drive wheel 29, a second driven wheel 30, and an endless second transmission member 31 wound around the second drive wheel 29 and the second driven wheel 30. The second drive wheel 29 and the second driven wheel 30 may be pulleys or gears such as sprockets, for example. The second transmission member 31 may be a belt or a chain, for example. The second drive wheel 29 is disposed on the crank axis L1, and rotates around the crank axis L1 together with the crankshaft 9. The second driven wheel 30 is disposed on an axis parallel to the crank axis L1, and rotates around the parallel axis together with the rotor of the alternator 27. The rotation of the second drive wheel 29 is transmitted to the second driven wheel 30 by the second transmission member 31. Accordingly, the rotation of the crankshaft 9 is transmitted to the alternator 27.

As shown in FIG. 2, the outboard motor 1 includes a starter 32 that starts the engine 2. The starter 32 is, for example, a motor. The starter 32 is housed inside the engine cover 6. The starter 32 is attached to the engine 2. The starter 32 includes a starting gear rotatable around an axis parallel to the crank axis L1. The starting gear is arranged to mesh with a gear 40 (refer to FIG. 3) provided on a gear portion 38 of a flywheel 33 described later at the start of the engine. The flywheel 33 rotates around the crank axis L1 together with the crankshaft 9. When the starter 32 rotates the starting gear, the rotation of the starting gear is transmitted to the crankshaft 9 via the flywheel 33. Accordingly, the engine 2 is started.

Next, the flywheel 33, a damper 34, and a twisting member 35 are described. Hereinafter, FIG. 2 and FIG. 3 are referred to.

The outboard motor 1 includes the flywheel 33 that accumulates torque, the damper 34 that absorbs twisting vibration of the crankshaft 9, and the twisting member 35 that transmits the rotation of the crankshaft 9 to the damper 34. The flywheel 33, the damper 34, and the twisting member 35 are disposed on the crank axis L1. In other words, the central axes of these members 33, 34, and 35 are disposed on the crank axis L1. The flywheel 33, the damper 34, and the twisting member 35 rotate around the crank axis L1 together with the crankshaft 9.

As shown in FIG. 3, the flywheel 33 preferably has a disk shape. The flywheel 33 is made of, for example, metal. The flywheel 33 is disposed along the upper surface of the engine 2 above the engine 2. The flywheel 33 includes a disk-shaped joint portion 36, an annular curved portion 37 provided along the outer periphery of the joint portion 36, and an annular gear portion 38 provided along the outer periphery of the curved portion 37. The joint portion 36 is disposed above the upper end portion 16 of the crankshaft 9. The joint portion 36 is in contact with a disk portion 18 provided on the upper end portion 16, and joined to the disk portion 18 preferably by a plurality of bolts 39, for example. The shaft portion 19 is inserted into a through-hole that penetrates the center portion of the joint portion 36 in the up-down direction. The shaft portion 19 projects upward from the joint portion 36. The gear portion 38 includes a gear 40 located on the outer periphery of the gear portion 38. The rotation of the starter 32 (refer to FIG. 2) is transmitted to the flywheel 33 by the gear 40 and the starter 32 meshing with each other. Accordingly, the flywheel 33 is driven to rotate.

On the other hand, as shown in FIG. 3, the damper 34 preferably has a cylindrical outer peripheral surface. The outer diameter of the damper 34 is larger than the outer diameter of the journal 17, and smaller than the outer diameter of the flywheel 33. The damper 34 is disposed above the upper end portion 16 of the crankshaft 9. The damper 34 is disposed above the flywheel 33 at a distance from the engine 2 and the flywheel 33. The damper 34 is not in contact with the engine 2 and the flywheel 33. The twisting member 35 is disposed between the damper 34 and the crankshaft 9. The damper 34 is joined to the twisting member 35. The damper 34 is joined to the crankshaft 9 via the twisting member 35. As shown in FIG. 2, the engine cover 6 includes a partition wall 41 that partitions the inside of the engine cover 6. The engine 2 and the damper 34 are disposed below the partition wall 41. The partition wall 41 covers the engine 2 and the damper 34.

As shown in FIG. 3, the damper 34 includes a weight 42, an elastic body 43, a ring 44, and a hub 45. The weight 42, the ring 44, and the hub 45 are made of, for example, metal. The elastic body 43 is made of an elastic material such as rubber or resin. The weight 42, the elastic body 43, and the ring 44 preferably are cylindrical, and disposed coaxially. The outer peripheral surface of the elastic body 43 is fixed to the inner peripheral surface of the weight 42 by, for example, gluing, and the inner peripheral surface of the elastic body 43 is fixed to the outer peripheral surface of the ring 44 by, for example, gluing. The ring 44 is fitted to the outer periphery of the hub 45. The ring 44 is fixed to the hub 45 by, for example, press fitting. Therefore, the weight 42 and the hub 45 are joined via the elastic body 43. The weight 42 and the hub 45 are displaced relative to each other around the crank axis L1 by elastic deformation of the elastic body 43. The second drive wheel 29 described above is provided on the outer peripheral portion of the weight 42. The second drive wheel 29 and the weight 42 are preferably integrated together so as to define a unitary member.

As shown in FIG. 3, the twisting member 35 is disposed along the crank axis L1 above the upper end portion 16 of the crankshaft 9. The twisting member 35 preferably is lighter in weight than the flywheel 33 and is less rigid than the flywheel 33. The twisting member 35 is elastically deformable around the crank axis L1. When a twisting torque of a predetermined value or more is applied to the twisting member 35, the twisting member 35 elastically twists around the crank axis L1. At this time, the twisting member 35 is elastically displaced around the crank axis L1 with respect to the flywheel 33. The twisting member 35 includes the first drive wheel 24 and the shaft portion 19. Specifically, in the first preferred embodiment, the first drive wheel 24 is shared by the first winding transmission device 23 and the twisting member 35, and the shaft portion 19 is shared by the crankshaft 9 and the twisting member 35. The first drive wheel 24 and the shaft portion 19 may be integrated together or may be members separate from each other.

The outer diameters of the first drive wheel 24 and the shaft portion 19 are smaller than the outer diameter of the journal 17. Further, the outer diameter of the shaft portion 19 is smaller than the outer diameter of the first drive wheel 24. The first drive wheel 24 is disposed between the hub 45 of the damper 34 and the shaft portion 19. The first drive wheel 24 is spaced away from the flywheel 33. The first transmission member 26 extends in a direction perpendicular or substantially perpendicular to the crank axis L1 at a height between the flywheel 33 and the damper 34. The hub 45, the first drive wheel 24, and the shaft portion 19 are aligned in the up-down direction in this order from the upper side. A connecting bolt 46 extending along the crank axis L1 is fitted to the hub 45, the first drive wheel 24, and the shaft portion 19 from above. A washer 47 is disposed between the head of the connecting bolt 46 and the hub 45. The damper 34 and the first drive wheel 24 are joined to the shaft portion 19 by the connecting bolt 46. Accordingly, the damper 34 and the twisting member 35 are joined to the crankshaft 9.

As described above, in the first preferred embodiment, the damper 34 is disposed above the flywheel 33 at a distance from the flywheel 33 that is heavy in weight. The damper 34 is joined to the twisting member 35 disposed along the crank axis L1 above the upper end portion 16 of the crankshaft 9. When the crankshaft 9 twists around the crank axis L1, the twisting member 35 also twists, and this twist of the crankshaft 9 is transmitted to the damper 34 via the twisting member 35. Thus, the damper 34 is spaced away from the flywheel 33 at a location that corresponds to a vibration node, and joined to the twisting member 35 at a location that corresponds to a vibration anti-node. Therefore, the twisting vibration of the crankshaft 9 is efficiently transmitted to the damper 34, and the damper 34 twists together with the crankshaft 9. Accordingly, the twisting vibration of the crankshaft 9 is efficiently absorbed by the damper 34, and vibration of the engine 2 is effectively and significantly reduced.

Figure 4:
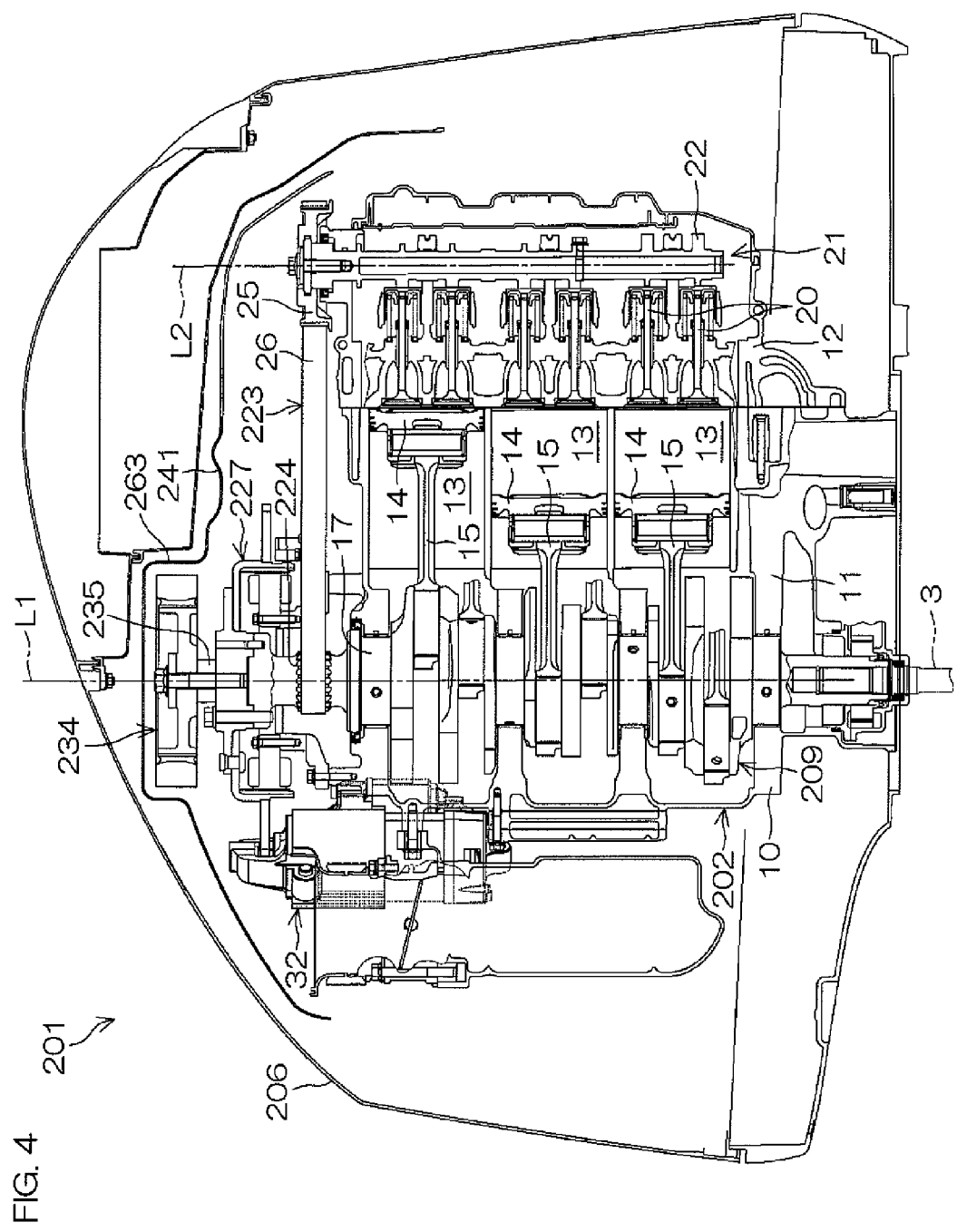
FIG. 4 is a sectional view for describing an arrangement inside an engine cover according to a second preferred embodiment of the present invention.

In the first preferred embodiment, the first drive wheel 24 is preferably disposed between the flywheel 33 and the damper 34. Therefore, the distance from the journal 17 to the flywheel 33 can be made shorter than in the case where the first drive wheel 224 is disposed between the flywheel 227 and the journal 17 as shown in FIG. 4. Therefore, the center of gravity of the flywheel 33 can be lowered. Further, the projection amount of the crankshaft 9 from the engine 2 (in detail, the crankcase 10 and the cylinder body 11) to the flywheel 33 can be reduced. Therefore, the force to be applied to the crankshaft 9 from the flywheel 33 can be reduced.

In the first preferred embodiment, the twisting member 35 preferably includes the first drive wheel 24 and the shaft portion 19. The outer diameters of the first drive wheel 24 and the shaft portion 19 are smaller than the outer diameter of the damper 34. Further, the outer diameters of the first drive wheel 24 and the shaft portion 19 are smaller than the outer diameter of the journal 17. Specifically, the first drive wheel 24 and the shaft portion 19 are thinner than the damper 34 and the journal 17. Specifically, the twisting member 35 has an outer diameter smaller than both of the outer diameters of the damper 34 and the journal 17. Therefore, the twisting member 35 twists more easily than the damper 34 and the journal 17. Accordingly, twist of the crankshaft 9 is reliably transmitted to the damper 34 via the twisting member 35. Therefore, the damper 34 can be reliably twisted and vibration of the engine 2 can be effectively and reliably reduced.

In the first preferred embodiment, the first drive wheel 24 is preferably included in the twisting member 35, and a portion of the twisting member 35 functions as the first drive wheel 24. Therefore, it is unnecessary to provide the first drive wheel 24 separately from the twisting member 35 and dispose the first drive wheel 24 above the damper 34. Therefore, the heights of the engine 2, etc., that is, the engine 2 and the devices attached to the engine can be reduced. Accordingly, even if the damper 34 is disposed above the flywheel 33, the engine 2, etc., can be prevented from being increased in height. Accordingly, the outboard motor 1 can be prevented from being increased in size.

Second Preferred Embodiment

Figure 5:
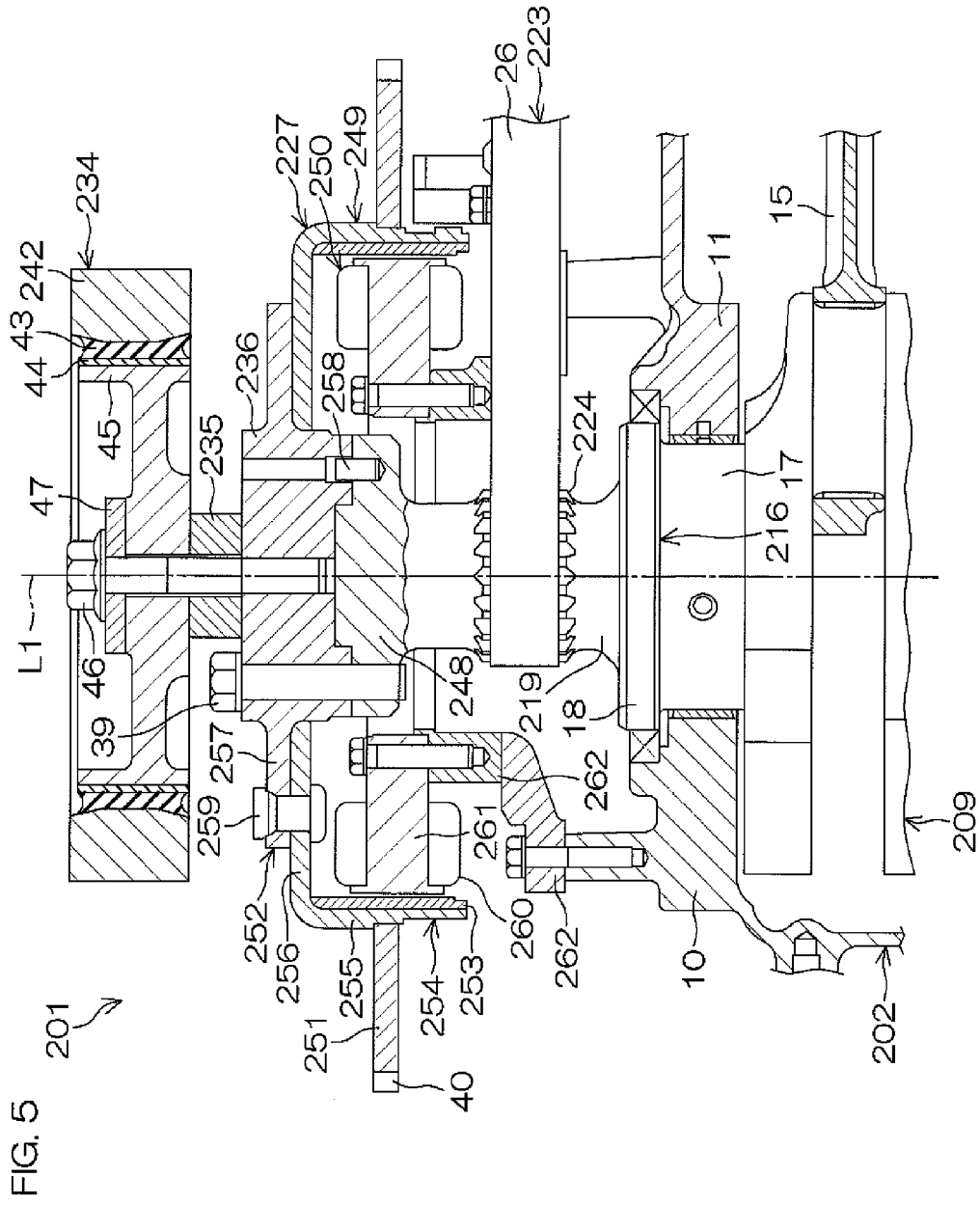
FIG. 5 is an enlarged view of a portion of FIG. 4.

Next, a second preferred embodiment of the present invention is described. A major difference between the second preferred embodiment and the first preferred embodiment described above is the arrangement inside the engine cover. In FIG. 4 and FIG. 5 described hereinafter, components equivalent to the components shown in FIG. 1 to FIG. 3 described above are designated by the same reference numerals as in FIG. 1, etc., and description thereof is omitted.

FIG. 4 is a sectional view for describing an arrangement inside an engine cover 206 according to a second preferred embodiment of the present invention. FIG. 5 is an enlarged view of a portion of FIG. 4. In FIG. 4, hatching is omitted.

An outboard motor 201 according to the second preferred embodiment preferably has the same or substantially the same arrangement as that of the outboard motor 1 according to the first preferred embodiment except for the arrangement inside the engine cover. Specifically, the outboard motor 201 includes an engine 202 instead of the engine 2. The engine 202 includes a crankcase 10, a cylinder body 11, and a cylinder head 12. The engine 202 further includes a crankshaft 209 that is rotatable around the crank axis L1 extending in the up-down direction.

As shown in FIG. 5, the crankshaft 209 includes an upper end potion 216 and a journal 17 disposed along the crank axis L1. The upper end portion 216 is disposed above the journal 17. The upper end portion 216 is disposed outside the crankcase 10 and the cylinder body 11. The upper end portion 216 includes a disk portion 18, a columnar shaft portion 219 with an outer diameter smaller than that of the journal 17, and a disk-shaped end portion 248 with an outer diameter larger than that of the shaft portion 219. The shaft portion 219 is disposed above the disk portion 18, and the end portion 248 is disposed above the shaft portion 219. The disk portion 18, the shaft portion 219, and the end portion 248 may be integrated together or may be members separate from each other.

As shown in FIG. 5, the disk portion 18, the shaft portion 219, and the end portion 248 are coaxial. The shaft portion 219 is disposed between the disk portion 18 and the end portion 248. The shaft portion 219 extends in the up-down direction along the crank axis L1. A first drive wheel 224 of a first winding transmission device 223 is provided at the intermediate portion of the shaft portion 219. The first transmission member 26 is wound around the first drive wheel 224. The first drive wheel 224 is disposed on the crank axis L1, and rotates around the crank axis L1 together with the crankshaft 209. The first drive wheel 224 and the shaft portion 219 may be integrated together or may be members separate from each other.

As shown in FIG. 5, the outboard motor 201 includes a flywheel magneto 227 as a power generation device, a damper 234 that absorbs twisting vibration of the crankshaft 209, and a twisting member 235 that transmits rotation of the crankshaft 209 to the damper 234. The flywheel magneto 227, the damper 234, and the twisting member 235 are disposed on the crank axis L1. The damper 234 and the twisting member 235 rotate around the crank axis L1 together with the crankshaft 209.

As shown in FIG. 5, the flywheel magneto 227 is disposed above the engine 202. The flywheel magneto 227 includes a tubular rotor 249 including a magnet 253, a tubular stator 250 including a coil 260, a ring gear 251 joined to the rotor 249, and a joint member 252 that joins the rotor 249 and the crankshaft 209. The rotor 249, the ring gear 251, and the joint member 252 also function as a flywheel that accumulates torque.

As shown in FIG. 5, the rotor 249 has an outer diameter larger than that of the journal 17. The rotor 249 includes a magnet 253 and a cup-shaped holder 254. The holder 254 includes a cylindrical portion 255 coaxial with the crankshaft 209, and an annular portion 256 extending inward from the upper end of the cylindrical portion 255. The cylindrical portion 255 has an inner diameter larger than the end portion 248. The cylindrical portion 255 surrounds the end portion 248 coaxially. Therefore, the end portion 248 is disposed inside the holder 254. The magnet 253 is disposed between the cylindrical portion 255 and the end portion 248. The magnet 253 is held by the inner peripheral surface of the cylindrical portion 255. The ring gear 251 is fitted to the outer periphery of the cylindrical portion 255. At the outer peripheral portion of the ring gear 251, a gear 40 that meshes with the starter 32 is provided.

As shown in FIG. 5, the joint member 252 includes a cylindrical joint portion 236 and an annular flange 257 extending outward from the outer peripheral portion of the joint portion 236. The joint portion 236 is inserted inside the annular portion 256. The joint portion 236 projects downward from the annular portion 256. The joint portion 236 and the end portion 248 are superimposed together in the up-down direction inside the holder 254. The joint portion 236 and the end portion 248 are positioned by a knock pin 258. Further, the joint portion 236 is joined to the end portion 248 by a plurality of bolts 39, for example. On the other hand, the flange 257 is disposed above the annular portion 256 of the holder 254. The flange 257 is joined to the annular portion 256 by a plurality of rivets 259, for example. Therefore, the rotor 249 is joined to the crankshaft 209 via the joint member 252. The rotor 249 is disposed on the crank axis L1, and rotates around the crank axis L1 together with the crankshaft 209.

As shown in FIG. 5, the stator 250 includes a coil 260 and a stator core 261 around which the coil 260 is wound. The stator 250 surrounds the upper end portion 216 of the crankshaft 209 coaxially. The stator 250 is disposed inward of the magnet 253. The stator 250 is opposed to the magnet 253 at a distance in the radial direction of the stator 250. The stator 250 is joined to the crankcase 10 via a bracket 262. The stator 250 does not rotate with respect to the crankcase 10. Therefore, when the crankshaft 209 rotates around the crank axis L1, the rotor 249 and the stator 250 rotate relative to each other. Accordingly, the rotation of the crankshaft 209 is converted into electric energy, and the flywheel magneto 227 generates power.

On the other hand, as shown in FIG. 5, the damper 234 has a cylindrical outer peripheral surface. The outer diameter of the damper 234 is larger than the outer diameter of the journal 17, and smaller than the outer diameter of the flywheel magneto 227. The damper 234 is disposed above the flywheel magneto 227 at a distance from the engine 202 and the flywheel magneto 227. The twisting member 235 is disposed between the damper 234 and the flywheel magneto 227. The damper 234 is joined to the crankshaft 209 via the twisting member 235 and the flywheel magneto 227. The damper 234 includes a cylindrical weight 242 having a cylindrical outer peripheral surface, an elastic body 43, a ring 44, and a hub 45. As shown in FIG. 4, the engine cover 206 that houses the engine 202 includes a partition wall 241 that partitions the inside of the engine cover 206. The engine 202 and the damper 234 are disposed below the partition wall 241. The partition wall 241 includes a recessed portion 263 recessed upward. The recessed portion 263 accommodates the damper 234.

As shown in FIG. 5, the twisting member 235 is disposed along the crank axis L1 above the upper end portion 216 of the crankshaft 209. The twisting member 235 is elastically deformable around the crank axis L1. Specifically, when a twisting torque of a predetermined value or more is applied to the twisting member 235, the twisting member 235 elastically twists around the crank axis L1. At this time, the twisting member 235 is elastically displaced around the crank axis L1 with respect to the flywheel magneto 227. The twisting member 235 is, for example, cylindrical. The damper 234, the twisting member 235, the flywheel magneto 227, and the upper end portion 216 are disposed in this order from the upper side. The connecting bolt 46 is fitted to the damper 234, the twisting member 235, and the flywheel magneto 227 from above. The damper 234 and the twisting member 235 are joined to the flywheel magneto 227 by the connecting bolt 46, for example. Accordingly, the damper 234 and the twisting member 235 are joined to the crankshaft 209.

As described above, in the second preferred embodiment, the damper 234 is disposed above the flywheel magneto 227 at a distance from the flywheel magneto 227 that is heavy in weight. Therefore, the damper 234 is spaced away from the flywheel magneto 227 that corresponds to a location of a vibration node, and is joined to the twisting member 235 that corresponds to a location of a vibration anti-node. Therefore, twisting vibration of the crankshaft 209 is efficiently transmitted to the damper 234, and the damper 234 twists. In addition, the twisting member 235 has an outer diameter smaller than both of the outer diameters of the damper 234 and the journal 17. Accordingly, the twisting vibration of the crankshaft 209 is efficiently absorbed by the damper 234, and vibration of the engine 202 is effectively and significantly reduced.

Third Preferred Embodiment

Figure 6:
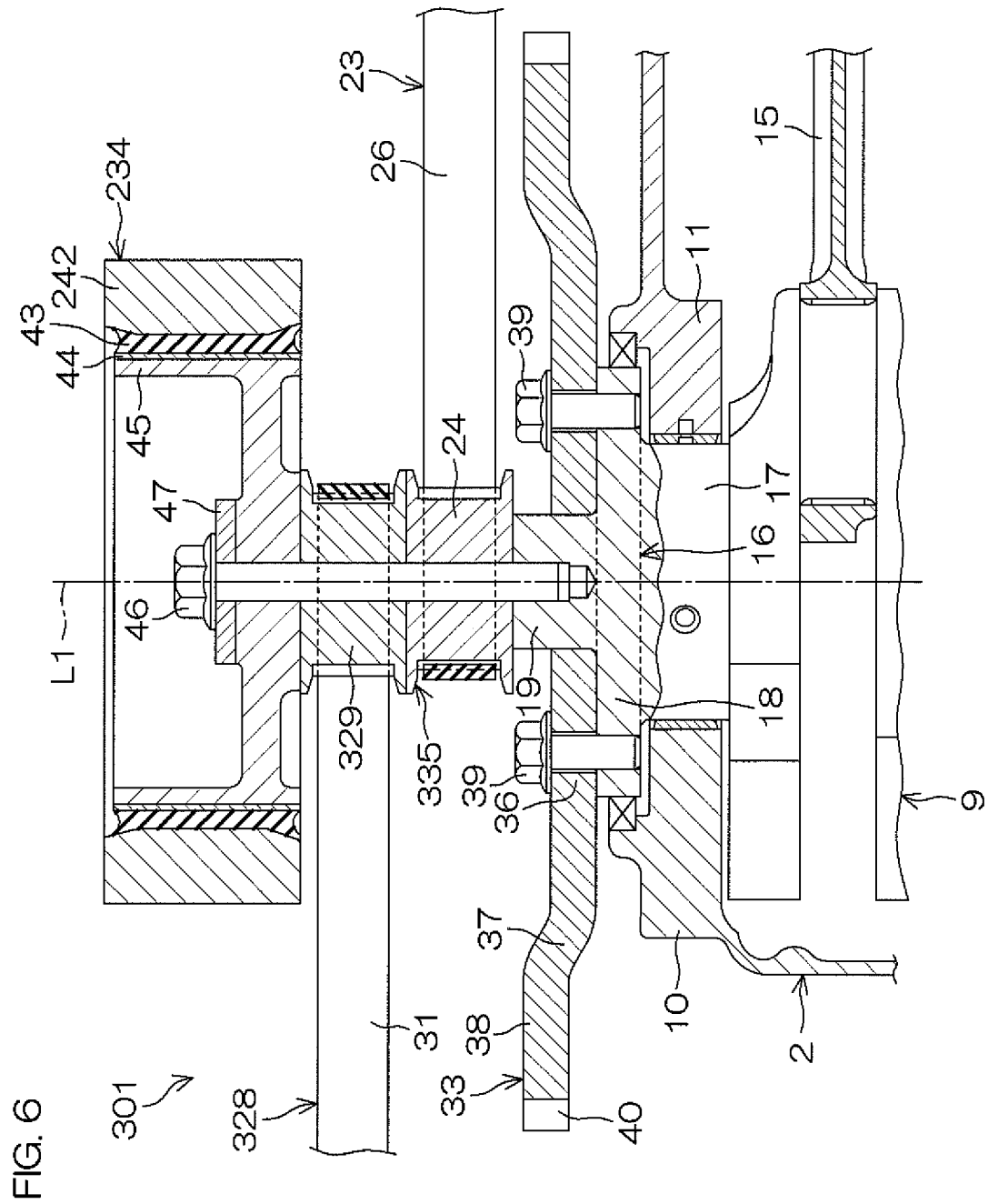
FIG. 6 is a sectional view of a flywheel, a damper, and a twisting member according to a third preferred embodiment of the present invention.

Next, a third preferred embodiment of the present invention is described. A major difference between the third preferred embodiment and the first preferred embodiment described above is that a third drive wheel disposed between the damper and the crankshaft is provided instead of the second drive wheel integrated with the damper. In FIG. 6 described below, components equivalent to the components shown in FIG. 1 to FIG. 5 described above are designated by the same reference numerals as in FIG. 1, etc., and description thereof is omitted.

FIG. 6 is a sectional view of a flywheel 33, a damper 234, and a twisting member 335 according to the third preferred embodiment of the present invention.

An outboard motor 301 according to the third preferred embodiment preferably has the same or substantially the same arrangement as that of the outboard motor 1 according to the first preferred embodiment. Specifically, the outboard motor 301 includes the damper 234 according to the second preferred embodiment instead of the damper 34 according to the first preferred embodiment. The outboard motor 301 further includes a twisting member 335 that transmits rotation of the crankshaft 9 to the damper 234, and a third winding transmission device 328 that transmits rotation of the crankshaft 9 to the alternator 27 (refer to FIG. 2). The third winding transmission device 328 includes a third drive wheel 329, a second driven wheel 30 (refer to FIG. 2), and a second transmission member 31.

The third drive wheel 329 is disposed between the first drive wheel 24 and the damper 234. The third drive wheel 329 may be disposed between the first drive wheel 24 and the crankshaft 9. The first drive wheel 24 and the third drive wheel 329 may be integrated together or may be members separate from each other. The outer diameter of the third drive wheel 329 is smaller than the outer diameter of the journal 17 and larger than the outer diameter of the shaft portion 19. The second transmission member 31 is wound around the third drive wheel 329 and the second driven wheel 30. The second transmission member 31 extends in a direction perpendicular to the crank axis L1 at a height between the first drive wheel 24 and the damper 234.

The twisting member 335 includes the shaft portion 19, the first drive wheel 24, and the third drive wheel 329. Specifically, in the third preferred embodiment, the third drive wheel 329 is shared by the third winding transmission device 328 and the twisting member 335. The connecting bolt 46 penetrates through the hub 45, the third drive wheel 329, and the first drive wheel 24 in the up-down direction. The damper 234, the third drive wheel 329, and the first drive wheel 24 are joined to the shaft portion 19 by the connecting bolt 46, for example. Twisting vibration of the crankshaft 9 is transmitted to the damper 234 by the twisting member 335. Accordingly, the twisting vibration of the crankshaft 9 is absorbed by the damper 234, and vibration of the engine 2 is effectively and significantly reduced.

As described above, in the third preferred embodiment, the twisting member 335 includes the first drive wheel 24, the third drive wheel 329, and the shaft portion 19. The outer diameters of the first drive wheel 24, the third drive wheel 329, and the shaft portion 19 are smaller than the outer diameter of the damper 234. Further, the outer diameters of the first drive wheel 24, the third drive wheel 329, and the shaft portion 19 are smaller than the outer diameter of the journal 17. That is, the first drive wheel 24, the third drive wheel 329, and the shaft portion 19 are thinner than the damper 234 and the journal 17. Specifically, the twisting member 335 has an outer diameter smaller than both of the outer diameters of the damper 234 and the journal 17. Therefore, the twisting member 335 twists more easily than the damper 234 and the journal 17. Therefore, twist of the crankshaft 9 is reliably transmitted to the damper 234 via the twisting member 335. Accordingly, the damper 234 can be reliably twisted and vibration of the engine 2 can be effectively and reliably reduced.

In the third preferred embodiment, the first drive wheel 24 is preferably included in the twisting member 335, and a portion of the twisting member 335 functions as the first drive wheel 24. Further, the third drive wheel 329 is included in the twisting member 335, and a portion of the twisting member 335 functions as the third drive wheel 329. Therefore, it is unnecessary to provide the first drive wheel 24 and the third drive wheel 329 separately from the twisting member 335 and dispose the first drive wheel 24 and third drive wheel 329 above the damper 234. Accordingly, the heights of the engine 2, etc., that is, the engine 2 and devices attached to the engine 2 can be reduced. Therefore, even if the damper 234 is disposed above the flywheel 33, the engine 2, etc., can be prevented from increasing in height. Accordingly, the outboard motor 301 can be prevented from increasing in size.

Preferred embodiments of the present invention have been described above; however, the present invention is not limited to the contents of the first to third preferred embodiments described above, and can be variously changed within the scope of claims.

For example, in the first preferred embodiment described above, a case where the damper 34 preferably includes the ring 44 is described. However, it is also possible that the ring 44 is not provided and the inner peripheral surface of the elastic body 43 is fixed to the outer peripheral surface of the hub 45.

Also, in the first preferred embodiment, a case where the second drive wheel 29 preferably is integrated with the damper 34 (weight 42) is described. However, it is also possible that the second drive wheel 29 and the weight 42 are members separate from each other, and the second drive wheel 29 is joined to the outer peripheral portion of the weight 42.

In addition, in the first preferred embodiment, a case where the outer diameter of the shaft portion 19 preferably is smaller than the outer diameter of the first drive wheel 24 is described. However, the outer diameter of the shaft portion 19 may be equal to the outer diameter of the first drive wheel 24, or may be larger than the outer diameter of the first drive wheel 24.

Similarly, in the third preferred embodiment, a case where the outer diameter of the shaft portion 19 preferably is smaller than the outer diameter of the third drive wheel 329 is described. However, the outer diameter of the shaft portion 19 may be equal to the outer diameter of the third drive wheel 329, or may be larger than the outer diameter of the third drive wheel 329.

Besides, the design can be variously changed within the scope of the matters described in claims.

Hereinafter, a non-limiting listing of correspondence relationships between the components described in the claims and components in the preferred embodiments described above is provided.

Crank axis: Crank axis L1
Upper end portion: Upper end portion 16, 216
Crankshaft: Crankshaft 9, 209
Engine: Engine 2, 202
Joint portion: Joint portion 36, 236
Flywheel: Flywheel 33, rotor 249, ring gear 251, joint member 252
Twisting member: Twisting member 35, 235, 335
Damper: Damper 34, 234
Outboard motor: Outboard motor 1, 201, 301
First drive wheel: First drive wheel 24
First driven wheel: First driven wheel 25
First transmission member: First transmission member 26
Second drive wheel: Second drive wheel 29
Second driven wheel: Second driven wheel 30
Second transmission member: Second transmission member 31
Third drive wheel: Third drive wheel 329
Third driven wheel: Second driven wheel 30
Third transmission member: Second transmission member 31
Journal: Journal 17
Shaft portion: Shaft portion 19, 219

The present application corresponds to Japanese Patent Application No. 2011-107504 filed in the Japan Patent Office on May 12, 2011, and the entire disclosure of this application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
    an engine including a crankshaft that is rotatable around a crank axis extending in an up-down direction and includes an upper end portion disposed along the crank axis;
    a flywheel that is disposed above the upper end portion of the crankshaft and includes a joint portion joined to the upper end portion;
    a twisting member that is disposed along the crank axis above the upper end portion of the crankshaft, and that rotates around the crank axis together with the crankshaft;
    a damper that is disposed above the flywheel at a distance from the flywheel, and joined to the twisting member;
    a drive wheel that rotates around the crank axis together with the crankshaft, the drive wheel and the damper defining a unitary member wherein an upper portion of the unitary member defines the damper and a lower portion of the unitary member defines the drive wheel;
    a driven wheel that rotates around an axis parallel to the crank axis; and
    a transmission member that is wound around the drive wheel and the driven wheel, and transmits rotation of the drive wheel to the driven wheel.

2. The outboard motor according to claim 1, further comprising:
    a first drive wheel disposed between the flywheel and the damper and that rotates around the crank axis together with the crankshaft;

a first driven wheel that rotates around an axis parallel to the crank axis; and an endless first transmission member that is wound around the first drive wheel and the first driven wheel, and transmits rotation of the first drive wheel to the first driven wheel; wherein the twisting member includes the first drive wheel.

3. The outboard motor according to claim 2, wherein the first drive wheel has an outer diameter smaller than an outer diameter of the damper.

4. The outboard motor according to claim 1, wherein the crankshaft includes a journal disposed along the crank axis, and the twisting member includes a shaft portion having an outer diameter smaller than an outer diameter of the journal.

5. The outboard motor according to claim 1, wherein the twisting member has an outer diameter smaller than an outer diameter of the damper.

6. The outboard motor according to claim 1, wherein the crankshaft includes a journal disposed along the crank axis, and the twisting member has an outer diameter smaller than an outer diameter of the journal.

7. The outboard motor according to claim 1, wherein the crankshaft includes a journal disposed along the crank axis, and the twisting member has an outer diameter smaller than both of an outer diameter of the journal and an outer diameter of the damper.

8. The outboard motor according to claim 1, wherein the twisting member is elastically deformable around the crank axis.

9. The outboard motor according to claim 1, wherein the damper includes a hub, a weight, and an elastic body disposed between the hub and the weight.

10. An outboard motor comprising:

an engine including a crankshaft that is rotatable around a crank axis extending in an up-down direction and includes an upper end portion disposed along the crank axis;

a flywheel that is disposed above the upper end portion of the crankshaft and includes a joint portion joined to the upper end portion;

a damper that is disposed above the flywheel at a distance from the flywheel;

a twisting member that is disposed along the crank axis between the flywheel and the damper, that rotates around the crank axis together with the crankshaft, and that is joined to the damper;

a first drive wheel disposed below the flywheel and that rotates around the crank axis together with the crankshaft;

a first driven wheel that rotates around an axis parallel to the crank axis; and an endless first transmission member that is wound around the first drive wheel and the first driven wheel, and transmits rotation of the first drive wheel to the first driven wheel.

11. The outboard motor according to claim 10, wherein the first drive wheel is disposed on the crank shaft.

* * * * *